April 21, 1970 IKUO MORI 3,507,559
RETROFOCUS TYPE WIDE ANGLE OBJECTIVE LENS
Filed Dec. 1, 1966
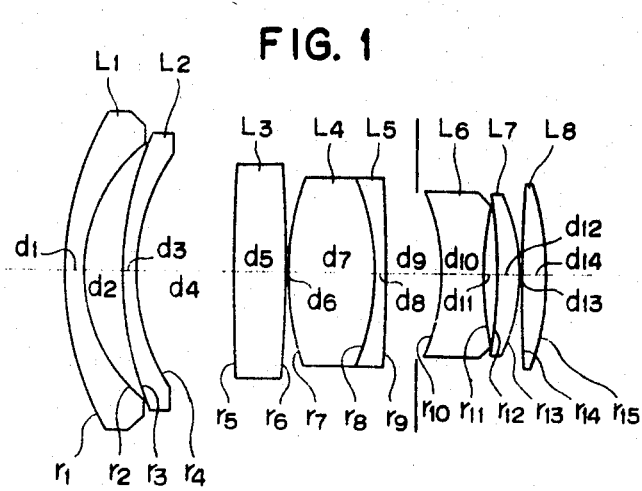
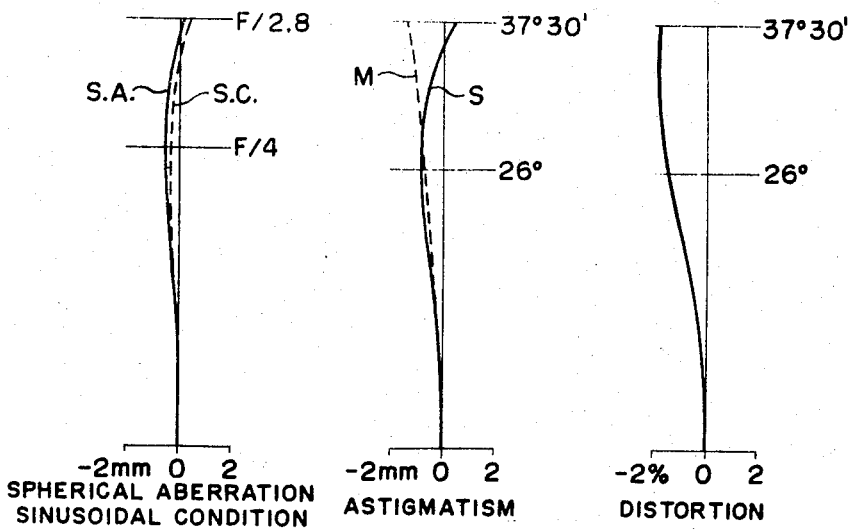

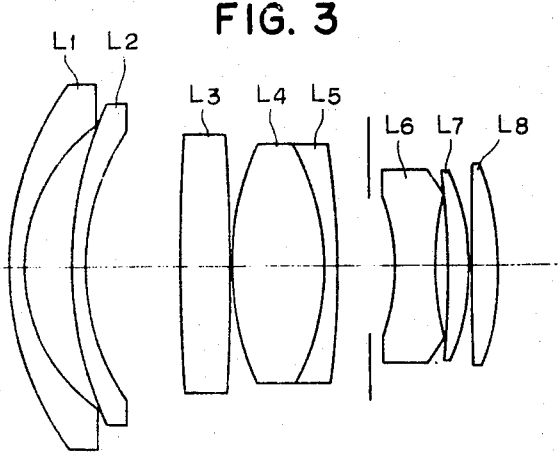
FIG. 3
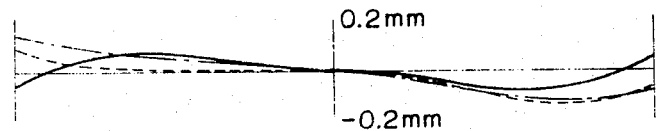
FIG. 4
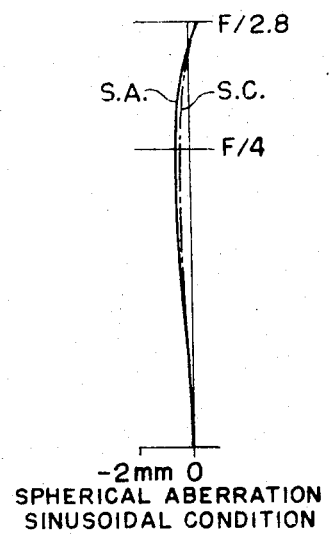
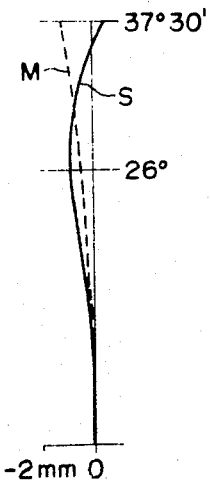
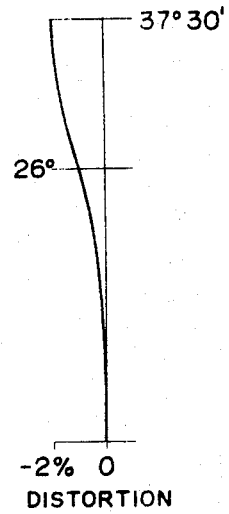

United States Patent Office 3,507,559
Patented Apr. 21, 1970

3,507,559
RETROFOCUS TYPE WIDE ANGLE OBJECTIVE LENS
Ikuo Mori, Kawasaki-shi, Japan, assignor to Nippon Kogaku K.K., Tokyo, Japan, a corporation of Japan
Filed Dec. 1, 1966, Ser. No. 598,249
Claims priority, application Japan, Dec. 7, 1965, 40/74,794
Int. Cl. G02b 9/00
U.S. Cl. 350—214                4 Claims

ABSTRACT OF THE DISCLOSURE

The present invention provides a retrofocus type wide angle objective comprising a front lens group of a dispersive system of which the refractive power is strengthened for shortening the distance between the dispersive system and the converging system. A member placed near the stop corrects the negative distortion, thereby obtaining a back focus longer than a definite length.

---

Figure 5:
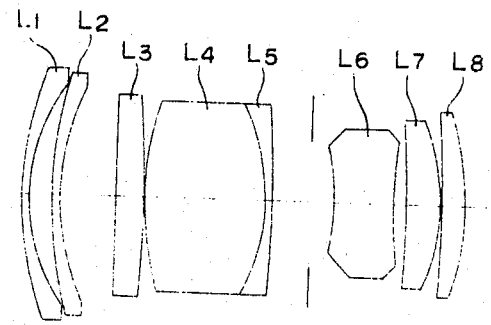

This invention relates to a retrofocus type wide angle objective lens.

Generally speaking, in retrofocus type lens system, when the focal length of the dispersive system of the front group is shortened, the back focus becomes longer and at the same time the lens size can be reduced. But in such a case, spherical aberration, distortion, and coma will be increased. It has hitherto been regarded to be very difficult to correct them.

In accordance with the invention, there is provided a retrofocus type wide angle objective in which the diameter of the lenses of the front group are small in spite of the fact that the aperture ratio thereof is F:2.8 and the angle of view is over 75°, and that the back focus is over 1.3 times larger than the focal length of the whole system ($f$), the objective lens being very small and light in weight, at the same time, one in which the various kinds of aberrations are highly corrected.

The objective lens of the present invention comprises a front lens group or dispersive system, comprising two negative meniscus lenses $L_1$ and $L_2$ with convex surfaces thereof being directed toward the object and a rear lens gorup comprising a positive single lens $L_3$, a positive doublet comprising two cemented lenses $L_4$ and $L_5$, a negative lens $L_6$, and two positive meniscus lenses $L_7$, $L_8$, with concave surface thereof being directed towards the object, the resultant objective satisfying the conditions $$d_4 < (d_5 + d_7 + d_8)$$
$$(d_7 + d_8) > d_5; \text{ and}$$
$$d_{10} > d_{11}$$

wherein $d$ stands for the thickness of the center of a lens or for the air space between adjacent lenses; $d_4$ being the air space between lenses $L_2$ and $L_3$, $d_5$ the thickness of lens $L_3$, $d_7$ the thickness of lens $L_4$, $d_8$ the thickness of lens $L_5$, $d_{10}$ the thickness of lens $L_6$, and $d_{11}$ being the air space between lenses $L_6$ and $L_7$.

Figure 6:
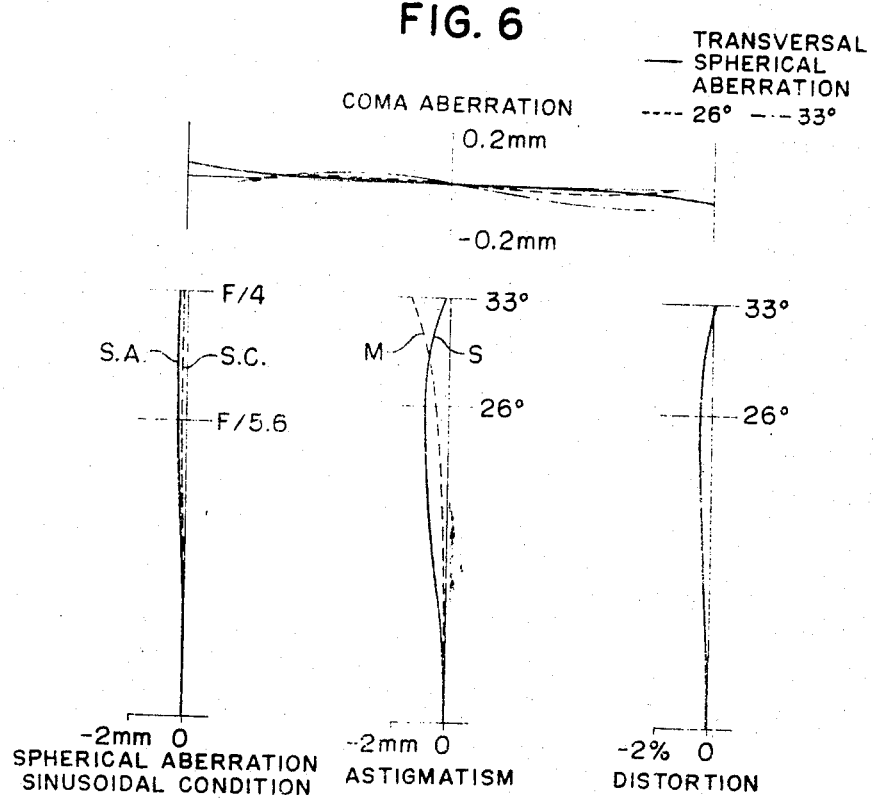

The present invention will now be described more in detail referring to the embodiments shown in the drawing, in which:

FIG. 1 is a cross section of Examples I and II of the optical system of the present invention;
FIG. 2 shows various aberration curves of Example I;
FIG. 3 is a cross section of Example III of the invention;
FIG. 4 shows various aberration curves of Example III;
FIG. 5 is a cross section of Example IV of the invention; and
FIG. 6 shows various aberration curves of Example IV.

Referring to FIG. 1 of the drawings, an embodiment of the present invention is illustrated in which the lens system comprises two lens groups. The front group comprises two negative meniscus lenses $L_1$ and $L_2$ having lens thicknesses $d_1$ and $d_3$ respectively, the two lenses being separated by and air space $d_2$. Lens $L_2$ is separated by a comparatively large air space $d_4$ from the rear group of lenses comprising a positive lens $L_3$ having a thickness $d_5$, separated by an air space $d_6$ from a positive doublet comprising a positive lens $L_4$ and a negative lens $L_5$ cemented together, the lenses $L_4$ and $L_5$ having thicknesses $d_7$ and $d_8$ respectively. Separated from the cemented doublet by a diaphragm D and an air space $d_9$, is a negative lens $L_6$ having a thickness $d_{10}$ separated by an air space $d_{11}$ from two positive meniscus lenses $L_7$ and $L_8$ having widths of $d_{12}$ and $d_{14}$, respectively and separated from each other by an air space $d_{13}$.

The radii of the various lens surfaces $r_1$ through $r_{16}$ are shown on the drawing.

The relationship of the lens thickness and the air space $d_4$ and $d_{11}$ of the lens system disclosed is as follows:

(I)            $d_4 < (d_5 + d_7 + d_8)$
(II)           $(d_7 + d_8) > d_5$
(III)          $d_{10} > d_{11}$ (wherein $d$ is the thickness of the center of a lens, or an axial distance between air separated lens surfaces).

In spite of the fact that the focal length of the dispersive system of the front group is comparatively shortened to about $-1.06f$, the whole system being reduced in size, the spherical aberration and distortion generated in the dispersive system of the front group are corrected by the conditions (I) and (II) set forth above, the condition (I) being also effective to reduce the size of the lens system. If conditions of (I) and (II) were not satisfied, although it would be possible to obtain a comparatively long back focus, the lens of the rear group placed on the image side of the diaphragm could not correct the spherical aberration and the negative distortion caused by the front lens grouping. When the refractive indices $n_4$ and $n_5$ of both of the lenses $L_4$ and $L_5$ are set up to be in the relation of $n_4 > n_5$, the above mentioned effect is made more effective, and at the same time it is preferable for the correction of chromatic aberration.

The condition (III) is the condition for correcting the astigmatism. Increasing the thickness of lens $L_6$, i.e., $d_{10}$, makes astigmatism smaller, but at the same time, it has the tendency to increase coma. In order to prevent that tendency the air space $d_{11}$ right after lens $L_4$ is decreased, and thus the coma is corrected without deteriorating astigmatism.

In general, a retrofocus type lens system has a drawback that the lens system itself and the aperture size of the front lens become large due to the following conditions which are necessary for assuring a back focus larger than a definite length:

(1) distance between the leading lens and the stop is large.

(2) in order to correct the negative distortion, a member having a positive refractive power is included in the dispersive system.

For solving the above problem, it is proposed to shorten the distance between the dispersive system and the converging system and to correct the negative distortion by a member placed as near to the stop as possible. According to this proposal, in the present invention, the condition I is given for shortening the distance between the leading or front lens and the stop. However, due to condition I, the back focus becomes short, so that in order to maintain the back focus to be longer than a definite length, it is necessary to make the focal length of the dispersive system relatively short, i.e., as long as $-1.06f$. However, this results in the deterioration in various aberrations, particularly, spherical aberration and distortion. By the use of a radius of curvature of which the concave surface being directed to the incident light rays to the positive lens locating before the stop, the distortion is corrected to some extent, while the spherical aberration is corrected by the condition II. In other words, the light rays projected parallel into the front lens receive a strong dispersive action by lenses $L_1$ and $L_2$ when they pass through lens $L_2$, and after passing, they still retain their dispersive state, which, however, shall receive converging action by the surface $R_7$ when they pass lenses $L_{4.5}$. As described, the light rays receive reverse actions when they pass respective lenses, so that it is necessary to let the light rays pass through near to the center of radius of curvature. For this purpose, as shown in condition II, it is necessary to make large the central thickness of the lens giving converging action. By this condition, distortion is also corrected. The condition $n_4$, $n_5$ makes the above mentioned effect more effective, and at the same time is is preferably for the correction of chromatic aberrations.

As mentioned, conditions I and II given to the front lens group before the stop are not sufficient enough for the correction of distortion. For solving this, condition III is given. Namely, in general, the back focus and the distortion are changed in the opposite directions, and when the central thickness $d_{10}$ of the lens $L_6$ is increased, it effectively works to shift both to the positive direction. However, it has the tendency to increase negative coma and the sagittal image surface is rapidly shifted to the positive direction. In order to prevent this tendency the space $d_{11}$ is decreased.

When the condition I is not followed, the back focus can be increased, but at the same time negative distortion is increased and it is not suitable for decreasing the total length of the lens system.

When condition II is not followed, the back focus can be increased, but particularly, the spherical aberration is deteriorated so that it becomes impossible to assure a larger aperture ratio as in the present invention.

When condition III is not followed, sagittal image surface and coma aberration can be compensated from each other, but distortion is deteriorated and the back focus is decreased so that it is not possible to obtain a long back focus as in the present invention.

As a result of carrying out other conventional means for correcting aberrations after giving said conditions (I) through (III), it is possible to excellently correct various aberrations in spite of the lens system being very small in size.

The following are the examples of the present invention, and Seidel's aberration coefficients thereof:

EXAMPLE I
$f=100$

| | | |
|---|---|---|
| $R_1=100.52$ | $d_1=5.59$ | $n_1=1.6425$ | $v_1=58.1$ |
| $R_2=54.0$ | $d_2=13.29$ | | |
| $R_3=128.85$ | $d_3=3.85$ | $n_2=1.62041$ | $v_2=60.3$ |
| $R_4=70.35$ | $d_4=31.47$ | | |
| $R_5=898.4$ | $d_5=17.48$ | $n_3=1.60342$ | $v_3=37.8$ |
| $R_6=-625.0$ | $d_6=0.35$ | | |
| $R_7=97.17$ | $d_7=30.0$ | $n_4=1.717$ | $v_4=47.9$ |
| $R_8=-80.42$ | $d_8=4.55$ | $n_5=1.50137$ | $v_5=56.5$ |
| $R_9=-301.4$ | $d_9=17.66$ | | |
| $R_{10}=-64.0$ | $d_{10}=14.0$ | $n_6=1.7552$ | $v_6=27.5$ |
| $R_{11}=-176.57$ | $d_{11}=3.5$ | | |
| $R_{12}=-300.0$ | $d_{12}=7.7$ | $n_7=1.6968$ | $v_7=55.6$ |
| $R_{13}=-61.1$ | $d_{13}=0.35$ | | |
| $R_{14}=-1468.5$ | $d_{14}=6.29$ | $n_8=1.63854$ | $v_8=55.5$ |
| $R_{15}=-100.8$ | | | |

B. $f=131.4$

SEIDEL'S ABERRATION COEFFICIENTS IN EXAMPLE I

| | $I_3$ | $II_3$ | $III_3$ | $IV_3$ | $V_3$ |
|---|---|---|---|---|---|
| $J_1$ | 0.234 | 0.090 | 0.492 | 0.422 | 0.162 |
| $J_2$ | -4.060 | 0.602 | -0.994 | -0.814 | 0.120 |
| $J_3$ | 0.968 | 0.248 | 0.488 | 0.360 | 0.092 |
| $J_4$ | -5.820 | 0.252 | -0.576 | -0.556 | 0.024 |
| $J_5$ | 0.982 | 0.460 | 0.688 | 0.256 | 0.120 |
| $J_6$ | -0.129 | -0.166 | -0.574 | -0.152 | -0.193 |
| $J_7$ | 5.800 | 0.938 | 0.884 | 0.580 | 0.094 |
| $J_8$ | 3.006 | -0.861 | 0.844 | 0.350 | -0.100 |
| $J_9$ | 1.655 | -0.956 | 1.758 | 0.662 | -0.384 |
| $J_{10}$ | -10.281 | 2.470 | -2.452 | -1.266 | 0.304 |
| $J_{11}$ | -2.918 | -1.742 | -3.358 | -1.282 | -0.764 |
| $J_{12}$ | 0.220 | 0.336 | 1.414 | 0.380 | 0.582 |
| $J_{13}$ | 5.046 | -0.775 | 1.032 | 0.792 | -0.122 |
| $J_{14}$ | -0.021 | 0.048 | -0.348 | -0.134 | 0.298 |
| $J_{15}$ | 6.534 | -0.938 | 0.790 | 0.520 | -0.075 |
| $\Sigma$ | 1.216 | 0.006 | 0.098 | 0.118 | 0.158 |

EXAMPLE II
$f=100$

| | | | |
|---|---|---|---|
| $R_1=103.15$ | $d_1=5.99$ | $n_1=1.6516$ | $v_1=58.5$ |
| $R_2=54.72$ | $d_2=13.29$ | | |
| $R_3=129.37$ | $d_3=3.85$ | $n_2=1.6223$ | $v_2=53.1$ |
| $R_4=60.73$ | $d_4=31.47$ | | |
| $R_5=979.0$ | $d_5=17.48$ | $n_3=1.6727$ | $v_3=32.3$ |
| $R_6=-700.0$ | $d_6=0.35$ | | |
| $R_7=97.2$ | $d_7=31.12$ | $n_4=1.72$ | $v_4=50.3$ |
| $R_8=-80.4$ | $d_8=4.55$ | $n_5=1.50137$ | $v_5=56.5$ |
| $R_9=-302.45$ | $d_9=17.58$ | | |
| $R_{10}=-63.29$ | $d_{10}=14.0$ | $n_6=1.72825$ | $v_6=28.3$ |
| $R_{11}=-176.6$ | $d_{11}=3.5$ | | |
| $R_{12}=-234.26$ | $d_{12}=7.0$ | $n_7=1.713$ | $v_7=53.9$ |
| $R_{13}=-62.94$ | $d_{13}=0.35$ | | |
| $R_{14}=-1073.4$ | $d_{14}=6.29$ | $n_8=1.6516$ | $v_8=58.5$ |
| $R_{15}=-93.7$ | | | |

B. $f=130.5$

SEIDEL'S ABERRATION COEFFICIENTS IN EXAMPLE II

|  | $I_2$ | $II_2$ | $III_2$ | $IV_2$ | $V_2$ |
|---|---|---|---|---|---|
| $J_1$ | 0.217 | 0.099 | 0.518 | 0.426 | 0.195 |
| $J_2$ | −4.037 | 0.406 | −0.844 | −0.762 | 0.076 |
| $J_3$ | 0.992 | 0.294 | 0.559 | 0.380 | 0.114 |
| $J_4$ | −5.902 | −0.001 | −0.544 | −0.544 | 0.000 |
| $J_5$ | 1.041 | 0.530 | 0.854 | 0.310 | 0.160 |
| $J_6$ | −0.160 | −0.200 | −0.666 | −0.184 | −0.226 |
| $J_7$ | 5.905 | 1.182 | 1.148 | 0.669 | 0.135 |
| $J_8$ | 3.051 | −0.740 | 0.638 | 0.282 | −0.068 |
| $J_9$ | 1.658 | −0.886 | 1.524 | 0.581 | −0.310 |
| $J_{10}$ | −10.421 | 2.001 | −1.840 | −1.058 | 0.205 |
| $J_{11}$ | −2.568 | −1.685 | −3.574 | −1.352 | −0.888 |
| $J_{12}$ | 0.095 | 0.208 | 1.190 | 0.278 | 0.610 |
| $J_{13}$ | 4.169 | −0.550 | 0.878 | 0.733 | −0.096 |
| $J_{14}$ | −0.016 | 0.036 | −0.302 | −0.126 | 0.300 |
| $J_{15}$ | 7.326 | −0.648 | 0.592 | 0.478 | −0.043 |
| $\Sigma$ | 1.350 | 0.046 | 0.131 | 0.111 | 0.164 |

FIG. 2 shows various aberration curves of example.

EXAMPLE III
$f=100 \quad 2\omega=75° \quad F/2.8$

| | | |
|---|---|---|
| $R_1=99.126$ | | |
| $R_2=54.895$ | $d_1=5.594$ | $n_1=1.6425$ | $v_1=58.1$ |
| $R_3=128.95$ | $d_2=16.78$ | | |
| $R_4=70.35$ | $d_3=3.846$ | $n_2=1.62041$ | $v_2=60.3$ |
| $R_5=911.7$ | $d_4=31.469$ | | |
| $R_6=-681.0$ | $d_5=17.482$ | $n_3=1.57309$ | $v_3=42.7$ |
| $R_7=97.167$ | $d_6=0.350$ | | |
| $R_8=-78.68$ | $d_7=29.72$ | $n_4=1.717$ | $v_4=47.9$ |
| $R_9=-300.5$ | $d_8=4.545$ | $n_5=1.50137$ | $v_5=56.5$ |
| $R_{10}=-64.38$ | $d_9=17.832$ | | |
| $R_{11}=174.2$ | $d_{10}=14.755$ | $n_6=1.7552$ | $v_6=27.5$ |
| $R_{12}=-323.32$ | $d_{11}=3.497$ | | |
| $R_{13}=-63.986$ | $d_{12}=7.692$ | $n_7=1.6968$ | $v_7=55.6$ |
| $R_{14}=-1900.5$ | $d_{13}=0.350$ | | |
| $R_{15}=-98.927$ | $d_{14}=8.040$ | $n_8=1.6425$ | $v_8=58.1$ |

B. $f=131.146$

SEIDEL'S ABERRATION COEFFICIENTS IN EXAMPLE III

|  | $I_3$ | $II_3$ | $III_3$ | $IV_3$ | $V_3$ |
|---|---|---|---|---|---|
| $J_1$ | 0.244 | 0.081 | 0.475 | 0.421 | 0.140 |
| $J_2$ | −3.738 | 0.656 | −0.058 | −0.828 | 0.145 |
| $J_3$ | 0.927 | 0.233 | 0.473 | 0.355 | 0.089 |
| $J_4$ | −5.804 | 0.311 | −0.594 | −0.562 | 0.030 |
| $J_5$ | 0.902 | 0.423 | 0.638 | 0.239 | 0.112 |
| $J_6$ | −0.138 | −0.167 | −0.553 | −0.149 | −0.180 |
| $J_7$ | 5.860 | 0.881 | 0.828 | 0.561 | 0.084 |
| $J_8$ | 3.240 | −0.943 | 0.928 | 0.380 | −0.111 |
| $J_9$ | 1.727 | −1.003 | 1.855 | 0.691 | −0.402 |
| $J_{10}$ | −10.380 | 2.590 | 2.609 | −1.316 | 0.328 |
| $J_{11}$ | −2.867 | −1.696 | −3.254 | −1.248 | −0.739 |
| $J_{12}$ | 0.230 | 0.342 | 1.409 | 0.384 | 0.573 |
| $J_{13}$ | 4.192 | −0.756 | 1.050 | 0.777 | −0.141 |
| $J_{14}$ | −0.013 | 0.034 | −0.301 | −0.114 | 0.311 |
| $J_{15}$ | 6.703 | −0.950 | 0.799 | 0.529 | −0.075 |
| $\Sigma$ | 1.185 | 0.036 | 0.086 | 0.120 | 0.164 |

FIG. 3 is the cross sectional view of optical system of Example III. FIG. 4 shows various aberration curves thereof, and Example III is characterized in that it has no vignetting.

EXAMPLE IV
$f=100 \quad 2\omega=66° \quad F/4$

| | | |
|---|---|---|
| $R_1=92.570$ | $d_1=2.00$ | $n_1=1.60241$ | $v_1=60.3$ |
| $R_2=50.000$ | $d_2=6.57$ | | |
| $R_3=124.130$ | $d_3=2.00$ | $n_2=1.60241$ | $v_2=60.3$ |
| $R_4=63.566$ | $d_4=14.71$ | | |
| $R_5=967.142$ | $d_5=8.00$ | $n_3=1.71736$ | $v_3=29.5$ |
| $R_6=-392.857$ | $d_6=1.43$ | | |
| $R_7=94.143$ | $d_7=32.71$ | $n_4=1.713$ | $v_4=53.9$ |
| $R_8=-68.214$ | $d_8=2.14$ | $n_5=1.50137$ | $v_5=56.5$ |
| $R_9=-310.685$ | $d_9=16.29$ | | |
| $R_{10}=-16.286$ | $d_{10}=17.00$ | $n_6=1.7552$ | $v_6=27.5$ |
| $R_{11}=180.045$ | $d_{11}=3.43$ | | |
| $R_{12}=-300.730$ | $d_{12}=9.43$ | $n_7=1.713$ | $v_7=53.9$ |
| $R_{13}=-59.524$ | $d_{13}=0.14$ | | |
| $R_{14}=-439.828$ | $d_{14}=6.43$ | $n_8=1.62041$ | $v_8=60.3$ |
| $R_{15}=-78.819$ | | | |

B. $f=122.1$

SEIDEL'S ABERRATION COEFFICIENTS IN EXAMPLE IV

|  | $I_3$ | $II_3$ | $III_3$ | $IV_3$ | $V_3$ |
|---|---|---|---|---|---|
| $J_1$ | 0.298 | 0.138 | 0.604 | 0.476 | 0.220 |
| $J_2$ | −5.234 | 0.290 | −0.814 | −0.782 | 0.043 |
| $J_3$ | 1.077 | 0.338 | 0.625 | 0.413 | 0.130 |
| $J_4$ | −7.578 | 0.088 | −0.605 | −0.604 | 0.007 |
| $J_5$ | 1.180 | 0.550 | 0.810 | 0.298 | 0.139 |
| $J_6$ | −0.092 | −0.155 | −0.679 | −0.156 | −0.263 |
| $J_7$ | 4.221 | 0.758 | 0.850 | 0.578 | 0.104 |
| $J_8$ | 2.309 | −0.793 | 0.939 | 0.393 | −0.135 |
| $J_9$ | 0.711 | −0.595 | 1.597 | 0.597 | −0.501 |
| $J_{10}$ | −5.702 | 1.907 | −2.581 | −1.307 | 0.437 |
| $J_{11}$ | −2.343 | −1.615 | −3.588 | −1.356 | −0.935 |
| $J_{12}$ | 0.227 | 0.366 | 1.632 | 0.451 | 0.729 |
| $J_{13}$ | 4.009 | −0.650 | 1.015 | 0.804 | −0.131 |
| $J_{14}$ | −0.058 | 0.085 | −0.461 | −0.212 | 0.311 |
| $J_{15}$ | 7.819 | −0.742 | 0.697 | 0.556 | −0.053 |
| $\Sigma$ | 0.844 | −0.030 | 0.041 | 0.149 | 0.102 |

FIG. 5 is the cross sectional view of the optical system of Example IV, and FIG. 6 shows various aberration curves thereof. It is inconvenient to use ordinary retrofocus lens system for large-sized single lens reflex cameras, such as, for example, of 6 cm. x 7 cm. film format, because the diameter of the front lens group is comparatively large. With the objectives of the present invention, that diameter can be reduced by making the values of $d_1$, $d_2$, and $d_3$ smaller.

As mentioned above, in accordance with the present invention, in spite of the fact that the diameter of front group lenses is small, it is possible to obtain a small, lightweight, wide angle objective lens of retrofocus type in which the aperture ratio is F/2.8, the angle of view is over 75°, and the back focus is over 1.3 times larger than the composite focal length of the lens system, and wherein various kinds of aberrations are well corrected.

What is claimed is:

1. A retrofocus type wide angle objective comprising a front lens groups or dispersive system including two negative meniscus lenses $L_1$ and $L_2$ with the covex surfaces thereof being directed toward the object, and a rear lens group comprising a positive single lens $L_3$, a positive doublet of a positive lens $L_4$ and a negative lens $L_5$ cemented together, a negative lens $L_6$ and two positive meniscus single lenses $L_7$, $L_8$ with the concave surfaces thereof being directed towards the object, the objective satisfying the conditions $$d_4 < (d_5 + d_7 + d_8)$$
$$(d_7 + d_8) > d_5; \text{ and}$$
$$d_{10} > d_{11}$$

and having the numerical data substantially as set forth in the following table:

$f=100$

| | | | |
|---|---|---|---|
| $R_1=100.52$ | $d_1=5.59$ | $n_1=1.6425$ | $v_1=58.1$ |
| $R_2=54.0$ | $d_2=13.29$ | | |
| $R_3=128.85$ | $d_3=3.85$ | $n_2=1.62041$ | $v_2=60.3$ |
| $R_4=70.35$ | $d_4=31.47$ | | |
| $R_5=898.4$ | $d_5=17.48$ | $n_3=1.60342$ | $v_3=37.8$ |
| $R_6=-625.0$ | $d_6=0.35$ | | |
| $R_7=97.17$ | $d_7=30.0$ | $n_4=1.717$ | $v_4=47.9$ |
| $R_8=-80.42$ | $d_8=4.55$ | $n_5=1.50137$ | $v_5=56.5$ |
| $R_9=-301.4$ | $d_9=17.66$ | | |
| $R_{10}=-64.0$ | $d_{10}=14.0$ | $n_6=1.7552$ | $v_6=27.5$ |
| $R_{11}=176.57$ | $d_{11}=3.5$ | | |
| $R_{12}=-300.0$ | $d_{12}=7.7$ | $n_7=1.6968$ | $v_7=55.6$ |
| $R_{13}=-61.1$ | $d_{13}=0.35$ | | |
| $R_{14}=-1468.5$ | $d_{14}=6.29$ | $n_8=1.63854$ | $v_8=55.5$ |
| $R_{15}=-100.8$ | | | |

B. $f=131.4$ wherein $R_1, R_2, \ldots$ represent the radii of curvature of the individual surfaces, $d_1, d_2, \ldots$ represent the axial thickness of the individual elements and the axial lengths of the air spaces between the components, $n_1, n_2, \ldots$ represent refractive indices of the individual elements and $V_1, V_2, \ldots$ represent Abbe numbers of the individual elements.

2. A retrofocus type wide angle objective comprising a front lens group or dispersive system including two negative meniscus lenses $L_1$ and $L_2$ with the covex surfaces thereof being directed toward the object, and a rear lens group comprising a positive single lens $L_3$, a positive doublet of a positive lens $L_4$ and a negative lens $L_5$ cemented together, a negative lens $L_6$ and two meniscus single lenses $L_7$, $L_8$ with the concave surfaces thereof being directed towards the object, the objective satisfying the conditions $$d_4<(d_5+d_7+d_8)$$
$$(d_7+d_8)>d_5; \text{ and}$$
$$d_{10}>d_{11}$$

and having the numerical data substantially as set forth in the following table:

$f=100$

| | | | |
|---|---|---|---|
| $R_1=103.15$ | $d_1=5.59$ | $n_1=1.6516$ | $v_1=58.5$ |
| $R_2=54.72$ | $d_2=13.29$ | | |
| $R_3=129.37$ | $d_3=3.85$ | $n_2=1.6223$ | $v_2=53.1$ |
| $R_4=70.63$ | $d_4=31.47$ | | |
| $R_5=979.0$ | $d_5=17.48$ | $n_3=1.6727$ | $v_3=32.2$ |
| $R_6=-700.0$ | $d_6=0.35$ | | |
| $R_7=97.2$ | $d_7=31.12$ | $n_4=1.72$ | $v_4=50.3$ |
| $R_8=-80.4$ | $d_8=4.55$ | $n_5=1.50137$ | $v_5=56.5$ |
| $R_9=-302.45$ | $d_9=17.58$ | | |
| $R_{10}=-63.29$ | $d_{10}=14.0$ | $n_6=1.72825$ | $v_6=28.3$ |
| $R_{11}=-176.6$ | $d_{11}=3.5$ | | |
| $R_{12}=-234.26$ | $d_{12}=7.0$ | $n_7=1.713$ | $v_7=53.9$ |
| $R_{13}=-62.94$ | $d_{13}=0.35$ | | |
| $R_{14}=1073.4$ | $d_{14}=6.29$ | $n_8=1.6516$ | $v_8=58.5$ |
| $R_{15}=-93.7$ | | | |

B. $f=130.5$ wherein $R_1, R_2, \ldots$ represent the radii of curvature of the individual surfaces, $d_1, d_2, \ldots$ represent the axial thickness of the individual elements and the axial lengths of the air spaces between the components, $n_1, n_2, \ldots$ represent refractive indices of the individual elements and $v_1, v_2, \ldots$ represent Abbe numbers of the individual elements.

3. A retrofocus type wide angle objective comprising a front lens group or dispersive system including two negative meniscus lenses $L_1$ and $L_2$ with the convex surfaces thereof being directed toward the object, and a rear lens group comprising a positive single lens $L_3$, a positive doublet of a positive lens $L_4$ and a negative lens $L_5$ cemented together, a negative lens $L_6$ and two positive meniscus single lenses $L_7$, $L_8$ with the concave surfaces thereof being directed towards the object, the objective satisfying the conditions $$d_4<(d_5+d_7+d_8);$$
$$(d_7+d_8)>d_5; \text{ and}$$
$$d_{10}>d_{11}$$

and having the numerical data substantially as set forth in the following table:

$f=100 \quad 2\omega=75° \quad F/2.8$

| | | | |
|---|---|---|---|
| $R_1=99.126$ | $d_1=5.594$ | $n_1=1.6425$ | $v_1=58.1$ |
| $R_2=54.895$ | $d_2=16.78$ | | |
| $R_3=128.95$ | $d_3=3.846$ | $n_2=1.6241$ | $v_2=60.3$ |
| $R_4=70.35$ | $d_4=31.469$ | | |
| $R_5=911.7$ | $d_5=17.482$ | $n_3=1.57309$ | $v_3=42.7$ |
| $R_6=-681.0$ | $d_6=0.350$ | | |
| $R_7=97.167$ | $d_7=29.72$ | $n_4=1.717$ | $v_4=47.9$ |
| $R_8=-78.67$ | $d_8=4.545$ | $n_5=1.50137$ | $v_5=56.5$ |
| $R_9=-300.5$ | $d_9=17.832$ | | |
| $R_{10}=-64.38$ | $d_{10}=14.755$ | $n_6=1.7552$ | $v_6=27.5$ |
| $R_{11}=174.2$ | $d_{11}=3.497$ | | |
| $R_{12}=-323.32$ | $d_{12}=7.692$ | $n_7=1.6968$ | $v_7=55.6$ |
| $R_{13}=-63.986$ | $d_{13}=0.350$ | | |
| $R_{15}=-1900.5$ | $d_{14}=8.040$ | $n_8=1.6425$ | $v_8=58.1$ |
| $R_{14}=-98.927$ | | | |

B. $f=131.146$ wherein $R_1, R_2, \ldots$ represents the radii of curvature of the individual surfaces, $d_1, d_2, \ldots$ represent the axial thickness of the individual elements and the axial lengths of the air spaces between the components, $n_1, n_2, \ldots$ represent refractive indices of the individual elements and $v_1, v_2, \ldots$ represent Abbe numbers of the individual elements.

4. A retrofocus type wide angle objective comprising a front lens group or dispersive system including two negative meniscus lenses $L_1$ and $L_2$ with the convex surfaces thereof being directed toward the object, and a rear lens group comprising a positive single lens $L_3$, a positive doublet of a positive lens $L_4$ and a negative lens $L_5$ cemented together, a negative lens $L_6$ and two positive meniscus single lenses $L_7$, $L_8$ with the concave surfaces thereof being directed towards the object, the objective satisfying the conditions $$d_4<(d_5+d_7+d_8);$$
$$(d_7+d_8)>d_5; \text{ and}$$
$$d_{10}>d_{11}$$

and having the numerical data substantially as set forth in the following table:

$f=100 \quad 2\omega=66° \quad F/4$

| | | | |
|---|---|---|---|
| $R_1=92.570$ | | | |
| | $d_1=2.00$ | $n_1=1.60241$ | $v_1=60.3$ |
| $R_2=50.000$ | | | |
| | $d_2=6.57$ | | |
| $R_3=124.130$ | | | |
| | $d_3=2.00$ | $n_2=1.60241$ | $v_2=60.3$ |
| $R_4=63.566$ | | | |
| | $d_4=14.71$ | | |
| $R_5=967.142$ | | | |
| | $d_5=8.00$ | $n_3=1.71736$ | $v_3=29.5$ |
| $R_6=-392.857$ | | | |
| | $d_6=1.43$ | | |
| $R_7=94.143$ | | | |
| | $d_7=32.71$ | $n_4=1.713$ | $v_4=53.9$ |
| $R_8=-68.214$ | | | |
| | $d_8=2.14$ | $n_5=1.50137$ | $v_5=56.5$ |
| $R_9=-340.685$ | | | |
| | $d_9=16.29$ | | |
| $R_{10}=-64.286$ | | | |
| | $d_{10}=17.00$ | $n_6=1.7552$ | $v_6=27.5$ |
| $R_{11}=180.045$ | | | |
| | $d_{11}=3.43$ | | |
| $R_{12}=-300.730$ | | | |
| | $d_{12}=9.43$ | $n_7=1.713$ | $v_7=53.9$ |
| $R_{13}=-59.524$ | | | |
| | $d_{13}=0.14$ | | |
| $R_{14}=-439.828$ | | | |
| | $d_{14}=6.43$ | $n_8=1.62041$ | $v_8=60.3$ |
| $R_{15}=-78.819$ | | | |

B. $f=122.1$ wherein $R_1$, $R_2$, ... represents the radii of curvature of the individual surfaces, $d_1$, $d_2$, ... represent the axial thickness of the individual elements and the axial lengths of the air spaces between the components, $n_1$, $n_2$, ... represents refractive indices of the individual elements and $v_1$, $v_2$, ... represent Abbe numbers of the individual elements.

References Cited
UNITED STATES PATENTS

| | | | |
|---|---|---|---|
| 2,746,351 | 5/1956 | Tronnier | 350—216 X |
| 3,016,799 | 1/1962 | Klemt et al. | 350—214 |
| 3,033,082 | 5/1962 | Merigold | 350—214 |

PAUL R. GILLIAM, Primary Examiner